United States Patent
Amano (10) Patent No.: US 9,827,856 B2
(45) Date of Patent: Nov. 28, 2017

(54) VEHICLE CONTROL DEVICE

(71) Applicant: TOYOTA JIDOSHA KABUSHIKI KAISHA, Toyota-shi, Aichi (JP)

(72) Inventor: Takashi Amano, Nisshin (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/893,623

(22) PCT Filed: Apr. 17, 2014

(86) PCT No.: PCT/JP2014/060921
§ 371 (c)(1),
(2) Date: Nov. 24, 2015

(87) PCT Pub. No.: WO2014/196275
PCT Pub. Date: Dec. 11, 2014

(65) Prior Publication Data
US 2016/0107527 A1  Apr. 21, 2016

(30) Foreign Application Priority Data
Jun. 3, 2013 (JP) .................................. 2013-116993

(51) Int. Cl.
*B60L 11/02* (2006.01)
*B60K 6/445* (2007.10)
(Continued)

(52) U.S. Cl.
CPC .............. *B60L 11/02* (2013.01); *B60K 6/445* (2013.01); *B60L 7/14* (2013.01); *B60L 7/26* (2013.01);
(Continued)

(58) Field of Classification Search
USPC ................... 701/22, 93; 123/142.5 E, 41.29; 104/289; 105/35; 180/65.1, 65.2, 65.21,
(Continued)

(56) References Cited

U.S. PATENT DOCUMENTS 7,575,825 B2 * 8/2009 Sugiura ............. H01M 8/04626
429/483
8,055,311 B2 * 11/2011 Izumi .................... H02J 7/0068
320/150
(Continued)

FOREIGN PATENT DOCUMENTS

| JP | 2002-109386 | * | 4/2002 | ........ H01M 8/04626 |
| JP | 2006-164056 | * | 6/2006 | ............ H02J 7/0068 |

(Continued)

OTHER PUBLICATIONS

Maximization of the Traction Forces in a 2WD Electric Vehicle; Guillermo A. Magallan; Cristian H. De Angelo; Guillermo O. Garcia; IEEE Transactions on Vehicular Technology; Year: 2011, vol. 60, Issue: 2; pp. 369-380, DOI: 10.1109/TVT.2010.2091659.*

(Continued)

*Primary Examiner* — Cuong H Nguyen
(74) *Attorney, Agent, or Firm* — Andrews Kurth Kenyon LLP (57) ABSTRACT

A vehicle control device operates an electric generator by an internal combustion engine and can intermittently drive an electric motor. The vehicle control device includes an electric storage unit and a control unit. The electric storage unit supplies electric power to the electric motor and can be charged by regenerative electric power from the electric generator. The control unit stops the intermittent driving mode provided that the vehicle speed is equal to or smaller than a predetermined speed and a status amount correspond- (Continued)

ing to an electric storage state of the electric storage unit is equal to or smaller than a predetermined value.

5 Claims, 3 Drawing Sheets

(51) Int. Cl.
*B60L 7/14* (2006.01)
*B60L 7/26* (2006.01)
*B60L 11/14* (2006.01)
*B60L 11/18* (2006.01)
*B60L 15/20* (2006.01)
*B60W 10/06* (2006.01)
*B60W 10/08* (2006.01)
*B60W 10/26* (2006.01)
*B60W 20/00* (2016.01)
*B60W 20/13* (2016.01)

(52) U.S. Cl.
CPC ........... *B60L 11/14* (2013.01); *B60L 11/1861* (2013.01); *B60L 15/2009* (2013.01); *B60W 10/06* (2013.01); *B60W 10/08* (2013.01); *B60W 10/26* (2013.01); *B60W 20/00* (2013.01); *B60W 20/13* (2016.01); *B60L 2210/40* (2013.01); *B60L 2220/14* (2013.01); *B60L 2240/12* (2013.01); *B60L 2240/423* (2013.01); *B60W 2510/244* (2013.01); *Y02T 10/6239* (2013.01); *Y02T 10/6286* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01)

(58) Field of Classification Search
USPC .................................................. 180/65.265
See application file for complete search history.

(56) References Cited

U.S. PATENT DOCUMENTS

| | | | | |
|---|---|---|---|---|
| 8,088,035 | B2* | 1/2012 | Yamamoto | B60K 6/365 477/101 |
| 8,483,896 | B2* | 7/2013 | Miyazaki | B60K 6/46 701/22 |
| 9,008,883 | B2* | 4/2015 | Ichimoto | B60W 10/06 180/65.21 |
| 9,381,826 | B2* | 7/2016 | Wu | B60L 11/1868 |
| 2003/0194586 | A1* | 10/2003 | Sugiura | H01M 8/04626 429/429 |
| 2007/0287509 | A1* | 12/2007 | Izumi | H02J 7/0068 455/573 |
| 2010/0087288 | A1* | 4/2010 | Yamamoto | B60K 6/445 477/3 |
| 2010/0175579 | A1* | 7/2010 | Read | B60T 1/10 105/1.4 |
| 2010/0186619 | A1* | 7/2010 | Kumar | B60L 7/06 104/289 |
| 2010/0324795 | A1 | 12/2010 | Tsumori et al. | |
| 2011/0029179 | A1* | 2/2011 | Miyazaki | B60K 6/46 701/22 |
| 2012/0123624 | A1 | 5/2012 | Sato et al. | |
| 2014/0111121 | A1* | 4/2014 | Wu | B60L 11/005 318/139 |
| 2016/0236588 | A1* | 8/2016 | Wu | B60L 11/1866 |

FOREIGN PATENT DOCUMENTS

| | | |
|---|---|---|
| JP | 2007-223404 A | 9/2007 |
| JP | 2007-331599 A | 12/2007 |
| JP | 2009-178579 * | 7/2009 ............... B60K 6/46 |
| JP | 2009190433 A | 8/2009 |
| JP | 2010006309 A | 1/2010 |
| JP | 2010-64576 A | 3/2010 |
| JP | 2010-202119 A | 9/2010 |
| JP | 2010-209902 A | 9/2010 |
| JP | 2012-110089 A | 6/2012 |
| JP | 2013-099088 A | 5/2013 |

OTHER PUBLICATIONS

Transient optimization of drive control strategy for pure electric passenger car;Hongwei Liu; Wenwen Guo; Liang Chu; Xiaowei Hao; Electronic and Mechanical Engineering and Information Technology (EMEIT), 2011 International Conference on Year: 2011, vol. 2; pp. 1025-1028, DOI: 10.1109/EMEIT.2011.6023269.*
A four-quadrant HEV drive system; S. Eriksson; C. Sadarangani; Vehicular Technology Conference, 2002. Proceedings. VTC 2002—Fall. 2002 IEEE 56th; Year: 2002, vol. 3; pp. 1510-1514 vol. 3, DOI: 10.1109/VETECF.2002.1040468.*
A sliding mode observer of road condition estimation for four-wheel-independent-drive electric vehicles; Yun Zhao; Yan-Tao Tian; Yu-Feng Lian; Lei-Lei Hu; Intelligent Control and Automation (WCICA), 2014 11th World Congress on Year: 2014; pp. 4390-4395, DOI: 10.1109/WCICA.2014.7053452.*
Development of a real-time testing environment for battery energy storage systems in renewable energy applications; Cody Hill; Dongmei Chen; 2011 IEEE Power and Energy Society General Meeting; Year: 2011; pp. 1-8, DOI: 10.1109/PES.2011.6039733.*
The photovoltaic charging station for electric vehicle to grid application in Smart Grids; Lei Shi; Haiping Xu; Dongxu Li; Zuzhi Zhang; Yuchen Han; 2012 IEEE 6th International Conference on Information and Automation for Sustainability; Year: 2012 pp. 279-284, DOI: 10.1109/ICIAFS.2012.6419917.*
Composite Energy Storage System Involving Battery and Ultracapacitor With Dynamic Energy Management in Microgrid; Applications; Haihua Zhou; Tanmoy Bhattacharya; Duong Tran; Tuck Sing Terence Siew; Ashwin M. Khambadkone; IEEE Transactions on Power Electronics; Year: 2011, vol. 26, Issue: 3; pp. 923-930, DOI: 10.1109/TPEL.2010.2095040.*
Energetic performance of a hybrid energy storage system based on compressed air and super capacitors; A. Rufer; S. Lemofouet; International Symposium on Power Electronics, Electrical Drives, Automation and Motion, 2006. SPEEDAM 2006; Year: 2006; pp. 469-474, DOI: 10.1109/SPEEDAM.2006.1649817.*
Kinetic energy storage for vehicles; K. R. Pullen; C. W. H. Ellis; Iet—The Institution of Engineering and Technolgy Hybrid Vehicle Conference 2006; Year: 2006; pp. 91-108.*
Regenerative braking strategy for electric vehicles; Jingang Guo; Junping Wang; Binggang Cao; 2009 IEEE Intelligent Vehicles Symposium; Year: 2009; pp. 864-868, DOI: 10.1109/IVS.2009. 5164393.*
Design of environmental friendly hybrid electric vehicle; M. Habib Ullah; T. S. Gunawan; M. R. Sharif; R. Muhida; 2012 International Conference on Computer and Communication Engineering (ICCCE); Year: 2012; pp. 544-548, DOI: 10.1109/ICCCE.2012. 6271246.*
Regenerative braking control strategy for fuel cell hybrid vehicles using fuzzy logic; Xiangjun Li; Liangfei Xu; Jianfeng Hua; Jianqiu Li; Minggao Ouyang; 2008 International Conference on Electrical Machines and Systems; Year: 2008; pp. 2712-2716.*
Design and implementation of an autonomous hybrid vehicle; K. Smith; A. Corregedor; C. Murcott; B. Andrews; S. Holte; M. Furrutter; M. Evans; J. Carroll; F. Du Plessis; J. Meyer; Africon, 2011; Year: 2011; pp. 1-6, DOI: 10.1109/Afrcon.2011.6072096.*
Nissan Motor Co.'s "Transmission Status Switching Controller for Hybrid Vehicle", by Amamiya Jun, JP2007331599 A, filed on Dec. 27, 2007.*

(56) References Cited

OTHER PUBLICATIONS

Drive Mode Optimization and Path Planning for Plug-In Hybrid Electric Vehicles; Chi-Kin Chau; Khaled Elbassioni; Chien-Ming Tseng; IEEE Transactions on Intelligent Transportation Systems; Year: 2017, Vol. PP, Issue: 99 ; pp. 1-12, DOI: 10.1109/Tits.2017.2691606.*

* cited by examiner

VEHICLE CONTROL DEVICE

CROSS-REFERENCE TO RELATED APPLICATIONS

This is a national phase application based on the PCT International Patent Application No. PCT/JP2014/060921 filed Apr. 17, 2014, claiming priority to Japanese Patent Application No. 2013-116993 filed Jun. 3, 2013, the entire contents of both of which are incorporated herein by reference.

TECHNICAL FIELD

The present invention relates to a vehicle control device which controls the driving state of a vehicle.

BACKGROUND TECHNIQUE

Conventionally, there is known a technique of improving the fuel efficiency by using inertia running. For example, in Patent Reference-1, there is proposed a technique of driving and braking an electric motor in pulses in order to alternately repeat a first period in which the vehicle is driven by driving and braking the electric motor at the most efficient motor torque and a second period in which the vehicle coasts without driving and braking the electric motor.

PRIOR ART REFERENCE

Patent Reference

Patent Reference-1: Japanese Patent Application Laid-open under No. 2012-110089

DISCLOSURE OF INVENTION

Problem to be Solved by the Invention

In such a driving mode that the electric motor is intermittently driven as described in Patent Reference-1, the regeneration process is not conducted at the time of sudden braking based on driving operation because the vehicle decelerates by use of the hydraulic brake. Thus, when the residual capacity of the battery is low at the time of the intermittent driving, the regeneration process is not conducted at the time of the sudden braking based on the driving operation. As a result, the vehicle is forced to start the engine after the stop in order to recover the residual capacity of the battery, which could cause deterioration of the fuel efficiency.

The present invention is made to solve the above-described problem, and its object is to provide a vehicle control device capable of properly suppressing the deterioration of the fuel efficiency by restricting the execution of the intermittent driving mode.

Means for Solving the Problem

According to one aspect of the present invention, there is provided a vehicle control device having an intermittent driving mode in which the vehicle control device operates an electric generator by an internal combustion engine and intermittently drives at least an electric motor, including: an electric storage unit configured to supply electric power to the electric motor and be charged by regenerative electric power from the electric generator; and a control unit configured, in a case where the electric motor is intermittently driven, to stop the intermittent driving mode provided that a stop of a vehicle is predicted by a vehicle stop prediction unit and a status amount corresponding to an electric storage state of the electric storage unit is equal to or lower than a predetermined value.

The vehicle control device is preferably applied to a vehicle which operates an electric generator by an internal combustion engine and which can intermittently drive an electric motor. The term "intermittent driving" herein indicates controlling the driving and the braking of the electric motor in pulses to alternately repeat a first period in which the vehicle is driven by driving and braking the electric motor at the most efficient motor torque and a second period in which the vehicle coasts without driving and braking the electric motor. During the first period, the vehicle control device may drive and brake not only the electric motor but also the internal combustion engine while driving the vehicle. The vehicle control device includes the electric storage unit and the control unit. The electric storage unit is configured to supply electric power to the electric motor and be charged by regenerative electric power from the electric generator. The control unit is configured, in a case where the electric motor is intermittently driven, to stop the intermittent driving mode provided that a stop of a vehicle is predicted by a vehicle stop prediction unit and a status amount corresponding to an electric storage state of the electric storage unit is equal to or smaller than a predetermined value.

Generally, in the case of the intermittent driving mode in which the electric motor is intermittently driven, the regenerative electric power for charging the battery is not generated at the time of sudden braking based on driving operation because the vehicle decelerates by use of the hydraulic brake. Thus, the vehicle control device recognizes the possibility to stop in addition to the necessity of the charge based on the status amount corresponding to the electric storage state of the electric storage unit. Then, the vehicle control device stops the intermittent driving mode in a case that the vehicle is likely to stop and charging the battery is needed. Thereby, the vehicle control device prevents the internal combustion engine from being driven for the purpose of the electric generation after the stop and can enhance the fuel efficiency. Namely, by stopping the intermittent driving and switching to the normal driving mode at the time of predicting the stop of the vehicle, the vehicle control device can perform the regenerative braking thereby to prevent the internal combustion engine from turning over at the time of the stop of the vehicle. This leads to achievement of high fuel efficiency. In other words, when the vehicle is unlikely to stop, the vehicle control device prevents the needless stop of the intermittent driving mode thereby to expand the implementation term of the intermittent driving mode and enhance the fuel efficiency.

In one mode of the vehicle control device, the vehicle stop prediction unit is configured to predict the stop of the vehicle at a time when the vehicle speed is equal to or lower than a predetermined speed. According to this mode, the vehicle control device can properly predict the stop of the vehicle.

In another mode of the vehicle control device, the vehicle control device further includes a road condition acquisition unit configured to acquire information on a condition of a road where the vehicle is running or the vehicle is going to run, wherein the control unit is configured to change the predetermined value based on the information on the condition of the road. According to this mode, the vehicle control device eases the restriction condition of the intermittent driving mode in accordance with the condition of the road where the vehicle is running or the vehicle is going to run. Thereby, it is possible to substantially increase opportunities to perform the intermittent driving mode and enhance the fuel efficiency.

In still another mode of the vehicle control device, the control unit is configured to predict a point where the vehicle is going to stop or decelerate based on the information of the condition of the road and lower the predetermined value in accordance with prospective regenerative electric power to be generated at a time of passing through the point. According to this mode, the vehicle control device can expand the implementation term of the intermittent driving mode while preventing the internal combustion engine from the load operation for charging the battery at the time of the restart from the stop.

In still another mode of the vehicle control device, the control unit is configured to stop the intermittent driving mode at a time of predicting deceleration of the vehicle based on the information on the condition of the road. According to this mode, the vehicle control device can properly perform the charge at the time of deceleration and ease the restriction condition of the intermittent driving mode.

DETAILED DESCRIPTION OF THE PREFERRED EMBODIMENTS

Preferred embodiments of the present invention will be explained hereinafter with reference to the drawings.

First Embodiment

Firstly, a description will be given of the first embodiment.

[Overall Configuration]

Figure 1:
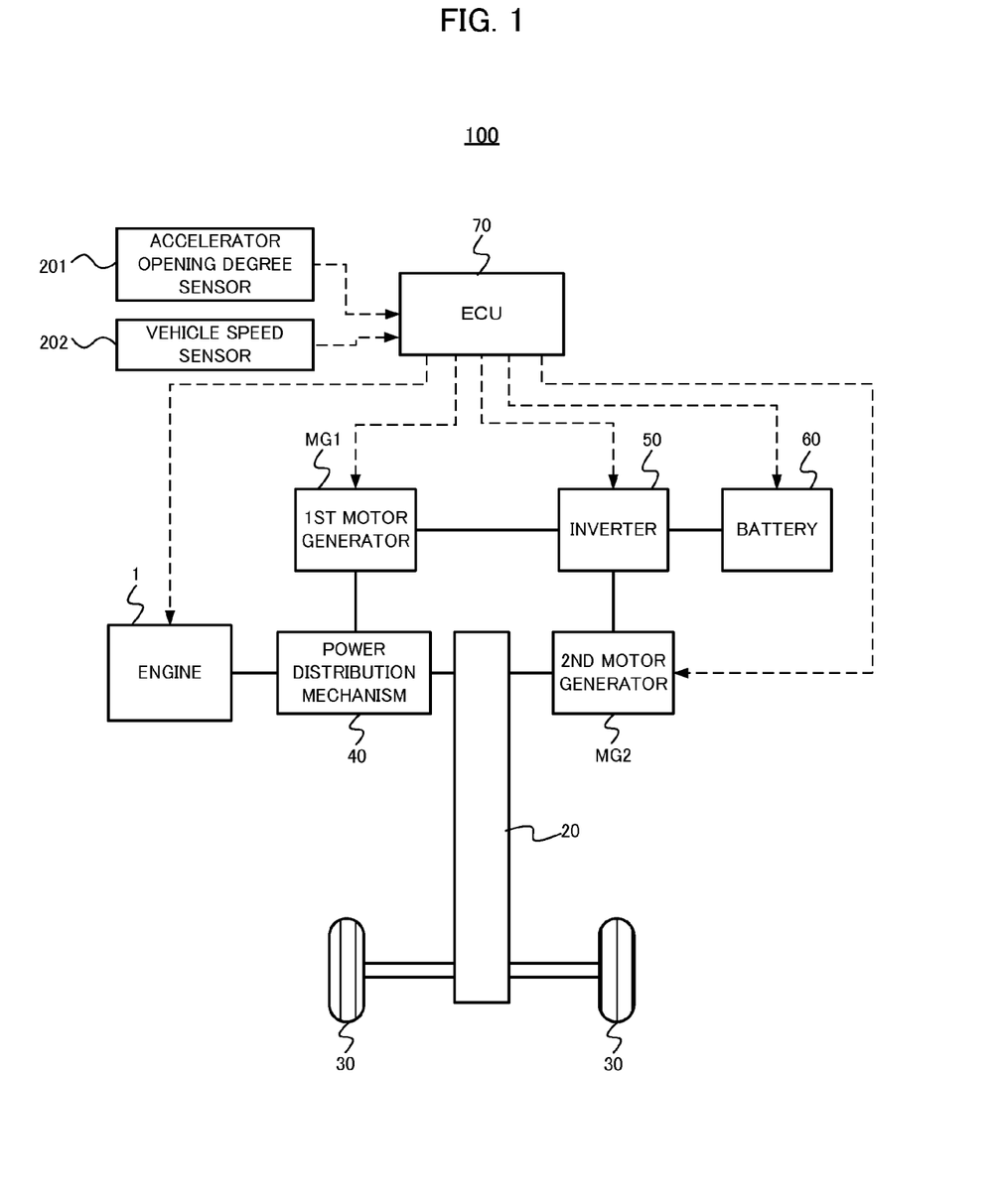
FIG. 1 illustrates a schematic configuration of a hybrid vehicle in a first embodiment to which the vehicle control device is applied.

FIG. 1 illustrates a schematic configuration of a hybrid vehicle 100 to which a vehicle control device in the first embodiment is applied. In FIG. 1, broken arrows show the input/output of signals.

The hybrid vehicle 100 mainly includes an engine (internal combustion engine) 1, an axle 20, wheels 30, a first motor generator MG1, a second motor generator MG2, a power distribution mechanism 40, an inverter 50, a battery 60 and an ECU (Electronic Control Unit) 70.

The axle 20 is apart of a power transmission system which transmits each power of the engine 1 and the second motor generator MG2 to the wheels 30. The wheels 30 are the wheels of the hybrid vehicle 100, and FIG. 1 especially illustrates only the right and left front wheels to simplify the explanation. The engine 1 is a gasoline engine, for example, and functions as a power source for outputting major driving force of the hybrid vehicle 100. For the engine 1, various controls are performed by the ECU 70.

The first motor generator MG1 is configured to function as a generator to mainly charge the battery 60 or as a generator to supply the electric power to the second motor generator MG2, and performs the electric generation through the output of the engine 1.

The second motor generator MG2 is configured to function as a generator to mainly assist the output of the engine 1. In addition, the second motor generator MG2 generates electric power by functioning as a regenerative brake and performing regenerative operation at the time of braking by an engine brake or a foot brake.

Each of the motor generators MG1 and MG2 is configured as a synchronous motor generator, for example, and include a rotor having plural permanent magnets on the outer circumferential surface and a stator around which three-phase coils for generating a rotating field are wound.

The power distribution mechanism 40 corresponds to a planetary gear train (planetary gear mechanism) that includes a sun gear and a ring gear, and is configured to distribute the output of the engine 1 to the first motor generator MG1 and the axle 20.

The inverter 50 is a DC/AC converter which controls the input/output of the electric power between the battery 60 and the first motor generator MG1 in addition to the input/output of the electric power between the battery 60 and the second motor generator MG2. For example, the inverter 50 converts the AC electric power generated by the first motor generator MG1 to the DC electric power and supplies it to the battery 60. Additionally, the inverter 50 converts the DC electric power taken out from the battery 60 to the AC electric power and supplies it to the second motor generator MG2.

The battery 60 is configured to function as a power supply to drive the first motor generator MG1 and/or the second motor generator MG2, and to charge the electric power generated by the first motor generator MG1 and/or the second motor generator MG2. The battery 60 is an example of "the electric storage unit" according to the present invention.

In the following description, the first motor generator MG1 and/or the second motor generator MG2 is arbitrarily referred to as "motor generator MG".

The ECU 70 includes a CPU (Central Processing Unit), a ROM (Read Only Memory) and a RAM (Random Access Memory), and executes various controls to each constitutional elements in the hybrid vehicle 100. For example, the ECU 70 is configured of a hybrid ECU, an engine ECU and a motor ECU. The ECU 70 performs a control based on an accelerator opening degree detected by an accelerator opening degree sensor 201, a vehicle speed detected by a vehicle speed sensor 202 and the charge amount (SOC: State of Charge) of the battery 60.

By controlling the engine 1 and the motor generator MG (in this case, the second motor generator MG2, the same hereinafter), the ECU 70 switches between the intermittent driving mode mentioned later and the normal driving mode in which the driving force in accordance with the accelerator opening degree is outputted.

A description will be given of the intermittent driving mode hereinafter. When the intermittent driving mode is in effect, the ECU 70 repeatedly accelerates and decelerates the vehicle speed to be in the range between a lower limit vehicle speed and an upper limit vehicle speed by intermittently operating the engine 1 and the motor generator MG, i.e., periodically switching the engine 1 and the motor generator MG on and off. For example, in the case where the intermittent driving mode is in effect, the ECU 70 puts the engine 1 and the motor generator MG into operation if the vehicle speed goes down to the lower limit vehicle speed because of the stop of the engine 1 and the motor generator MG. Thereafter, the ECU 70 stops the engine 1 and the motor generator MG if the vehicle speed goes up to the upper limit vehicle speed. The ECU 70 repeatedly executes the above-mentioned control process for the purpose of achievement of the high fuel efficiency.

The ECU 70 performs the intermittent driving mode in accordance with the accelerator opening degree equivalent to the power requested by the driver. For example, the ECU 70 performs the intermittent driving mode if the accelerator opening degree detected by the accelerator opening degree sensor 201 is constant for a predetermined time. In another example, the ECU 70 starts the determination on whether or not to perform the intermittent driving mode in such a case (e.g., at the time of mild acceleration or mild deceleration) that the variation range of the accelerator opening degree for a predetermined time is within a predetermined range. Then, the ECU 70 functions as "the control unit" according to the present invention.

[Restriction of Intermittent Driving Mode]

The ECU 70 according to the first embodiment restricts the execution of the intermittent driving mode based on the SOC if the ECU 70 determines based on the vehicle speed that the vehicle is likely to stop. Concretely, the ECU 70 does not execute the intermittent driving mode if the SOC is equal to or lower than a predetermined value (referred to as "predetermined value Sth") and the vehicle speed is equal to or lower than a predetermined speed (referred to as "predetermined speed Vth"). The above-mentioned predetermined value Sth is determined based on experimental trials in consideration of the presence/absence of the necessity of the charge of the battery 60, for example. The above-mentioned predetermined speed Vth is set based on experimental trials to such an upper limit vehicle speed that the vehicle is likely to stop, for example.

A supplemental explanation will be given of the effect of the process according to the first embodiment. Generally, when the intermittent driving mode is in effect at the time of deceleration of the vehicle, the vehicle is decelerated by the hydraulic brake in accordance with the operation amount of the brake pedal without regeneration through the motor generator MG. Thus, if the intermittent driving mode is in effect at the time when the battery 60 needs to charge, the battery 60 misses a chance to charge at the time of a driving state, such as decelerating state just before stop, capable of generating a lot of regenerative electric power. This gives rise to a need to forcibly turn over the engine 1 after the stop, and could cause deterioration of the fuel efficiency as a result.

Considering the above fact, in the case that the SOC is equal to or smaller than the predetermined value Sth, the ECU 70 does not perform the intermittent driving mode and instead performs the normal driving mode in which the driving force in accordance with the accelerator opening degree is outputted. Thereby, it is possible to prevent the deterioration of the fuel efficiency which is associated with a low level of the SOC and which is caused by the above-mentioned inability to regenerate electric power at the time of deceleration for stopping. It is noted that in a case where the vehicle speed is higher than the predetermined speed Vth, the ECU 70 does not restrict the execution of the intermittent driving mode even if the SOC is equal to or smaller than the predetermined value Sth. Thereby, the ECU 70 properly limits the prohibition period of the intermittent driving mode and can expand the implementation terms of the intermittent driving mode to enhance the fuel efficiency.

Figure 2:
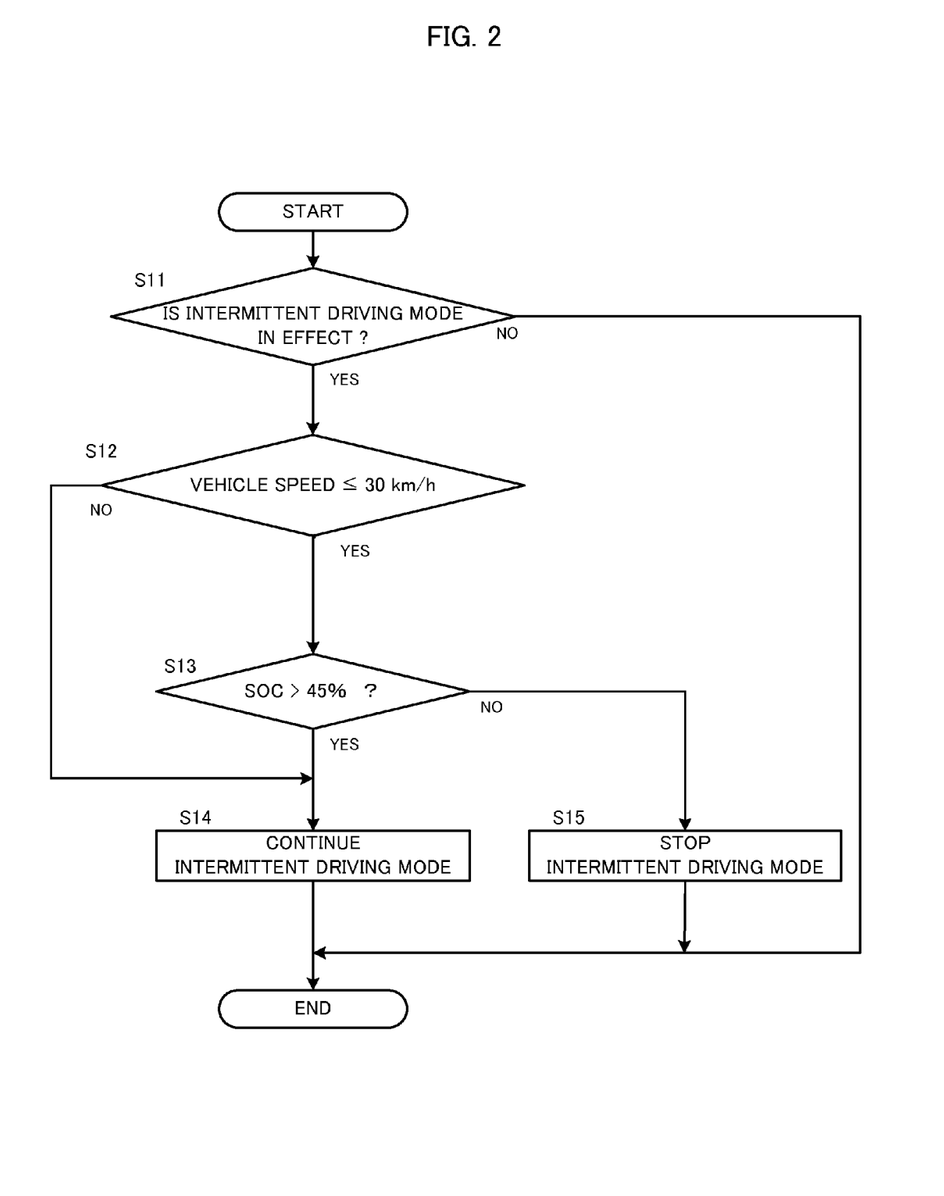
FIG. 2 is an example of a flowchart executed by an ECU according to the first embodiment.

FIG. 2 is an example of a flowchart executed by the ECU 70 according to the first embodiment. On the assumption of FIG. 2, as an example, the ECU 70 sets the predetermined value Sth to 45% and the predetermined speed Vth to 30 km/h. At the time of starting the flowchart in FIG. 2, on the basis of the accelerator opening degree, the ECU 70 has been performing either one of the intermittent driving mode or the normal driving mode in which the driving force in accordance with the accelerator opening degree is outputted.

First, the ECU 70 determines whether or not the intermittent driving mode is in effect (step S11). Then, when the intermittent driving mode is in effect (step S11; Yes), the ECU 70 executes the process at step S12. In contrast, when the intermittent driving mode is not in effect (step S12; No), the ECU 70 ends the process of the flowchart.

Next, on the basis of the output of the vehicle speed sensor 202, the ECU 70 determines whether or not the vehicle speed is equal to or lower than 30 km/h (step S12). Then, when the vehicle speed exceeds 30 km/h (step S12; No), the ECU 70 continues to perform the intermittent driving mode (step S14). In this way, the ECU 70 continues to perform the intermittent driving mode in the condition that the vehicle speed is relatively high and it is unlikely for the vehicle to stop. Thereby, it is possible to enhance the fuel efficiency.

In contrast, when the vehicle speed is equal to or lower than 30 km/h (step S12; Yes), the ECU 70 additionally determines whether or not the SOC is higher than 45% (step S13). When the SOC is higher than 45% (step S13; Yes), the ECU 70 continues to perform the intermittent driving mode (step S14).

When the vehicle speed is equal to or lower than 30 km/h and the SOC is equal to or lower than 45% (step S13; No), the ECU 70 prohibits itself from performing the intermittent driving mode (step S15). In other words, the ECU 70 stops the intermittent driving mode and performs normal driving mode which generates the driving force in accordance with the accelerator opening degree. In this way, in the condition that the vehicle speed goes down to such a speed that the vehicle is likely to stop and the necessity of the charge of the battery 60 becomes high, the ECU 70 stops the intermittent driving mode thereby to be ready to generate the regenerative electric power through the motor generator MG at the time of the deceleration to stop. Thereby, the ECU 70 can suppress the deterioration of the fuel efficiency due to a low level of the SOC.

Preferably, the ECU 70 lifts the prohibition of the intermittent driving mode in case where the SOC goes up to 45% again or the vehicle speed exceeds 30 km/h after once prohibiting itself from performing the intermittent driving mode at step S15.

Second Embodiment

In addition to the control according to the first embodiment, the ECU 70 according to the second embodiment changes the predetermined value Sth that is a threshold of the SOC based on the road condition where the vehicle is running or going to run. Thereby, the ECU 70 expands the implementation term of the intermittent driving mode to enhance the fuel efficiency.

Figure 3:
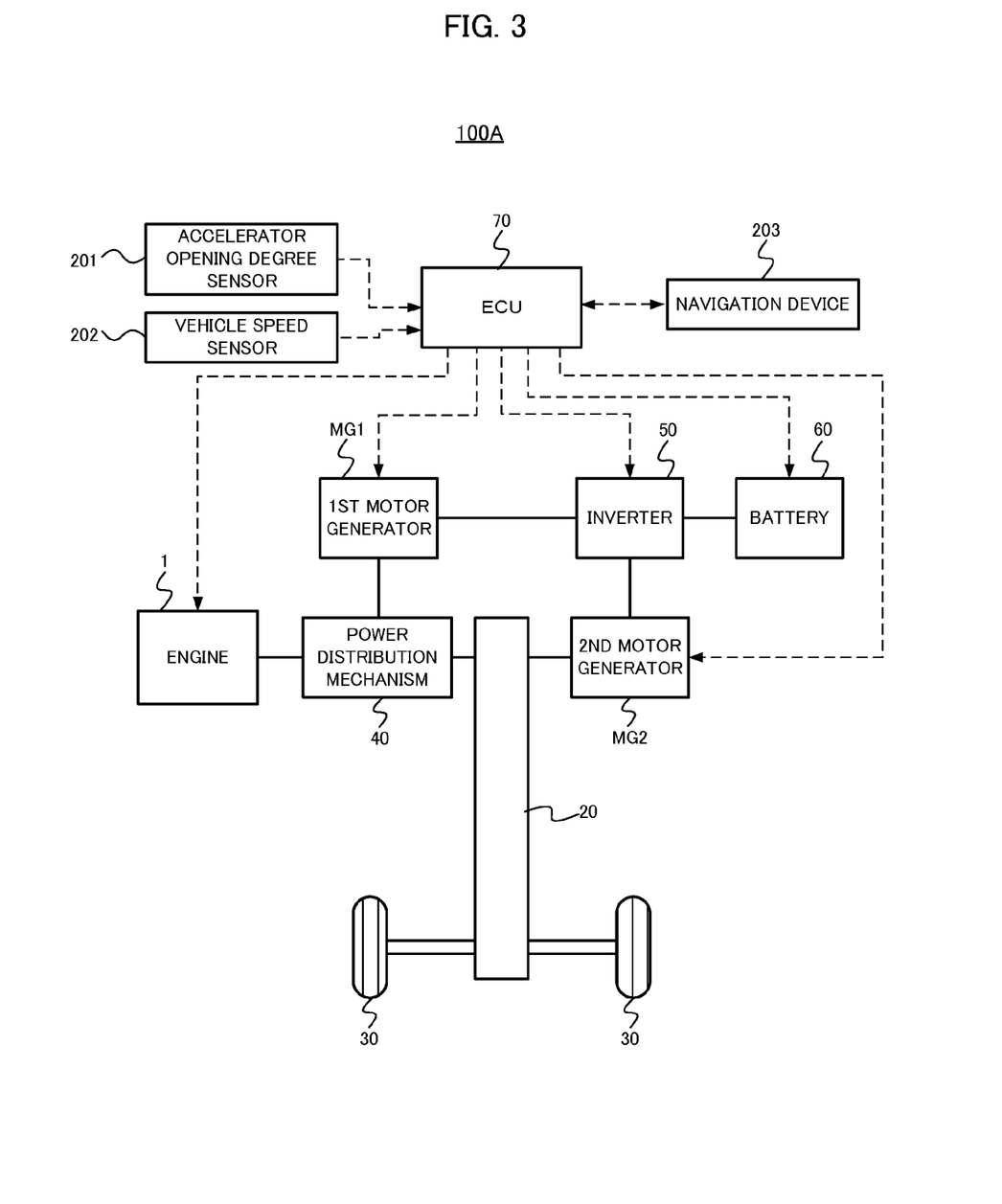
FIG. 3 illustrates a schematic configuration of a hybrid vehicle according to a second embodiment.

FIG. 3 illustrates a schematic configuration of a hybrid vehicle 100A according to the second embodiment. As illustrated in FIG. 3, the hybrid vehicle 100A differs from the hybrid vehicle 100 according to the first embodiment in that the hybrid vehicle 100A includes the navigation device 203. Hereinafter, the same elements as the configuration of the first embodiment will accordingly be provided with the same reference numbers and the explanation thereof will accordingly be omitted.

The navigation device 203 navigates the driver as to the driving route by displaying on its display the present position and the destination based on a GPS (Global Positioning System), vehicle speed pulses and a stand-alone position measurement device such as a gyroscope. The navigation device 203 recognizes a point (referred to as "predicted stop point") that the vehicle is predicted to stop on the route where the vehicle is running or going to run, and supplies the ECU 70 with signals indicating information on the distance to the predicted stop point. Examples of the predicted stop point include a stop position, the end position of a traffic jam and other positions which will require the vehicle to stop, for example.

Then, when the ECU 70 determines, on the basis of the information supplied from the navigation device 203, that the vehicle approaches the predicted stop point within a predetermined distance, the ECU 70 stops the intermittent driving mode to perform the normal driving mode in which the driving force in accordance with the accelerator opening degree is outputted. The above-mentioned predetermined distance is a slowing-down distance necessary for the vehicle to stop at the predicted stop point. It may be a variable value determined in accordance with the vehicle speed or a fixed value determined in advance. Thereby, the ECU 70 can make sure to regenerate electric power through the motor generator MG at the time of decelerating for stopping except sudden braking based on the driver operation.

Furthermore, the ECU 70 estimates the proportion of the SOC to be increased through the regeneration control at the next predicted stop point and lowers the predetermined value Sth that is a threshold of the SOC in accordance with the proportion. For example, in the case of the flowchart in FIG. 2, if the ECU 70 estimates the proportion of the SOC to be increased at the next predicted stop point at 5%, the ECU 70 sets the predetermined value Sth to be used at step S12 to "40%" that is lower than "45%" by 5%. In the case that the SOC is equal to or lower than 40% and the vehicle approaches the predicted stop point within a predetermined distance, the ECU 70 prohibits itself from performing the intermittent driving mode and regenerates electric power through the motor generator MG at the time of decelerating to stop at the predicted stop point. Thereby, the ECU 70 limits the prohibition period of the intermittent driving mode to the minimum to enhance the fuel efficiency.

It is noted that instead of the navigation device 203, the ECU 70 may obtain the condition of the road where the vehicle is running or going to run from the ITS (Intelligent Transport Systems) thereby to recognize the predicted stop point.

Third Embodiment

According to the third embodiment, on the basis of other condition(s) except for or in addition to the vehicle speed, the ECU 70 predicts the stop of the vehicle. Then, when the stop of the vehicle is predicted, the ECU 70 restricts the execution of the intermittent driving mode in accordance with the SOC.

For example, as the above-mentioned other condition(s), on the basis of the stepping-on amount of the brake sensed by a brake pedal position sensor, the gradient of the deceleration of the vehicle, the gradient of the deceleration of the turbine rotation speed of a turbine wheel and/or the pressure of the brake control (or the changing rate thereof) of the wheels 30, the ECU 70 predicts the stop of the vehicle. Specifically, the ECU 70 determines that the vehicle is going to stop in the case that the stepping-on amount of the brake is equal to or larger than a predetermined amount, the gradient of the deceleration of the vehicle is equal to or larger than a predetermined value, the gradient of the deceleration of the turbine rotation speed of the turbine wheel is equal to or larger than a predetermined value and/or the pressure of the brake control of the wheels 30 is equal to or higher than a predetermined value. When determining that the vehicle is going to stop, the ECU 70 prohibits itself from performing the intermittent driving mode provided that the SOC is equal to or smaller than the predetermined value Sth. It is noted that the prediction method of the stop of the vehicle is disclosed in Japanese Patent Applications Laid-open under No. 2009-108728 and 2009-264481. The ECU 70 according to the third embodiment functions as "the vehicle stop prediction unit".

[Modification]

When the SOC is equal to or smaller than the predetermined value Sth, the ECU 70 may prohibit itself from performing the intermittent driving mode regardless of the vehicle speed to perform the normal driving mode in which the driving force in accordance with the accelerator opening degree is outputted. Even in this case, the ECU 70 can prevent deterioration of the fuel efficiency due to inability to generate regenerative electric power at the time of deceleration for stopping in the case of the SOC being low.

DESCRIPTION OF REFERENCE NUMBERS

1 Engine
40 Power Distribution Mechanism
50 Inverter
60 Battery
70 ECU
100 Hybrid Vehicle
201 Accelerator Opening Degree Sensor
202 Vehicle Speed Sensor
203 Navigation Device
MG1 First Motor Generator
MG2 Second Motor Generator

The invention claimed is:

1. A vehicle control device for a hybrid vehicle including an internal combustion engine and an electric motor to generate power to wheels of the hybrid vehicle, the vehicle control device having an intermittent driving mode in which the vehicle control device operates an electric generator by the internal combustion engine and intermittently drives at least the electric motor, comprising:
an electric storage unit configured to supply electric power to the electric motor and be charged by regenerative electric power from the electric generator; and
a control unit configured, in a case where the electric motor is intermittently driven, to stop the intermittent driving mode if a stop of the vehicle is predicted by a vehicle stop prediction unit and a status amount corresponding to an electric storage state of the electric storage unit is equal to or smaller than a predetermined value, the predetermined value being higher than a value such that it is necessary to charge the electric storage unit by starting the internal combustion engine after a stop of the vehicle, the control unit to charge the electric storage by the regenerative electric power at a time of braking of the vehicle in a mode other than the intermittent driving mode and not to charge the electric storage by the regenerative electric power at a time of braking of the vehicle in the intermittent driving mode.

2. The vehicle control device according to claim 1,
wherein the vehicle stop prediction unit is configured to predict the stop of the vehicle at a time when the vehicle speed is equal to or lower than a predetermined speed.

3. The vehicle control device according to claim 1, further comprising
a road condition acquisition unit configured to acquire information on a condition of a road where the vehicle is running or the vehicle is going to run,
wherein the control unit is configured to change the predetermined value based on the information on the condition of the road.

4. The vehicle control device according to claim 3,
wherein the control unit is configured to stop the intermittent driving mode at a time of predicting deceleration of the vehicle based on the information on the condition of the road.

5. The vehicle control device according to claim 3,
wherein the control unit is configured to predict a point where the vehicle is going to stop based on the information of the condition of the road and lower the predetermined value in accordance with prospective regenerative electric power to be generated at a time when the vehicle decelerates in order to stop at the point.

* * * * *